Aug. 7, 1923.

J. LEDWINKA 1,464,207

ASSEMBLING AND WELDING JIG

Filed Dec. 17, 1921    3 Sheets-Sheet 1

Witness
Walter M. Trout

INVENTOR.
JOSEPH LEDWINKA
BY C. B. DesJardins
ATTORNEY.

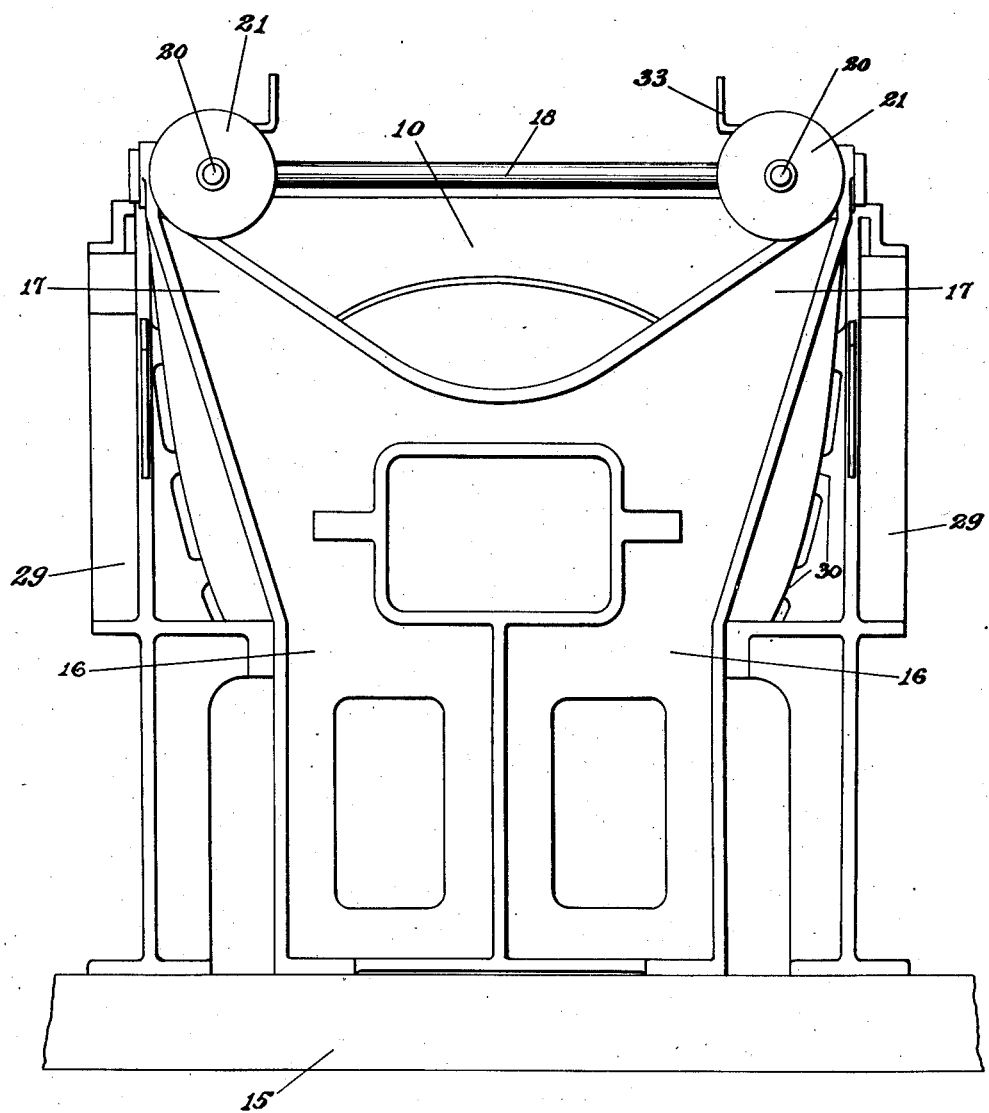

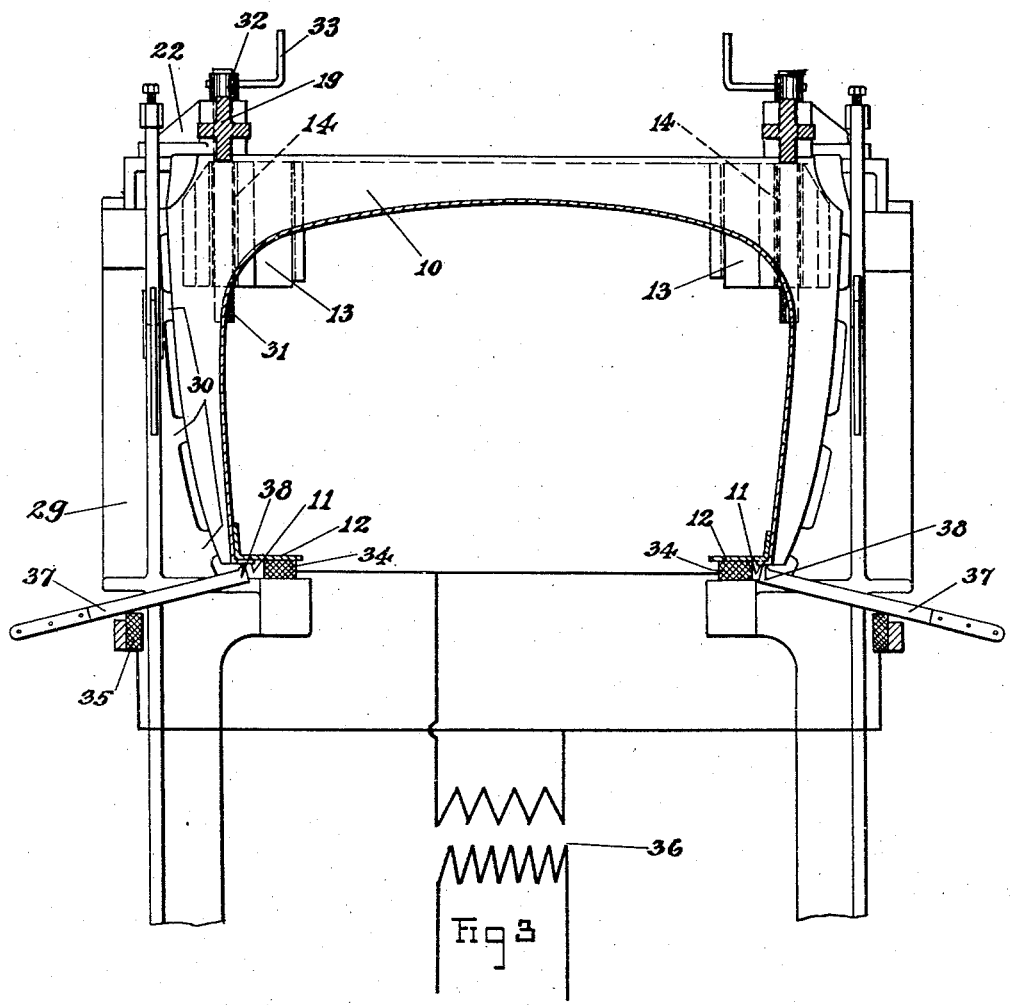

Patented Aug. 7, 1923.

1,464,207

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ASSEMBLING AND WELDING JIG.

Application filed December 17, 1921. Serial No. 523,058.

*To all whom it may concern:*

Be it known that I, JOSEPH LEDWINKA, a citizen of the United States, residing at Philadelphia, Pennsylvania, have invented certain new and useful Improvements in Assembling and Welding Jigs, of which I declare the following to be a full, clear, and exact description.

This invention relates to improvements in assembling and welding jigs and has to do, more particularly with jigs for assembling and electrically welding together the parts of automobile bodies and other structures, and it involves improvements on the jigs or assembling machines shown in United States Letters Patent No. 1,216,466, and in my pending application for United States Letters Patent, Serial No. 452,503, filed March 15, 1921.

One of the objects of my present invention is to provide a jig, for assembling and welding together the parts of an automobile body, which is provided with improved means for positioning the cowl panel in the jig and holding it correctly positioned while being welded to the body frame.

Another object of my present invention is to provide an improved means for welding together the parts of an automobile body or other structure so arranged as to facilitate the mounting of the parts in the jig and expedite their assembly.

Further objects, and objects relating to details and economies of construction and operation will definitely appear from the detailed description to follow. My invention is clearly defined and pointed out in the appended claims. A structure, constituting a preferred embodiment of my invention, is illustrated in the accompanying drawing forming a part of this specification in which:

Fig. 2 is a view of the jig in front elevation.

Fig. 3 is a view in vertical section, taken on the line 3—3 of Fig. 1, showing a cowl stamping, held in place and position to be welded to the body frame, or for other parts to be welded thereto.

In the drawing the same reference numerals refer to the same parts throughout the several views and the sectional view is taken looking in the direction of the arrows at the ends of the section lines.

Figure 1:
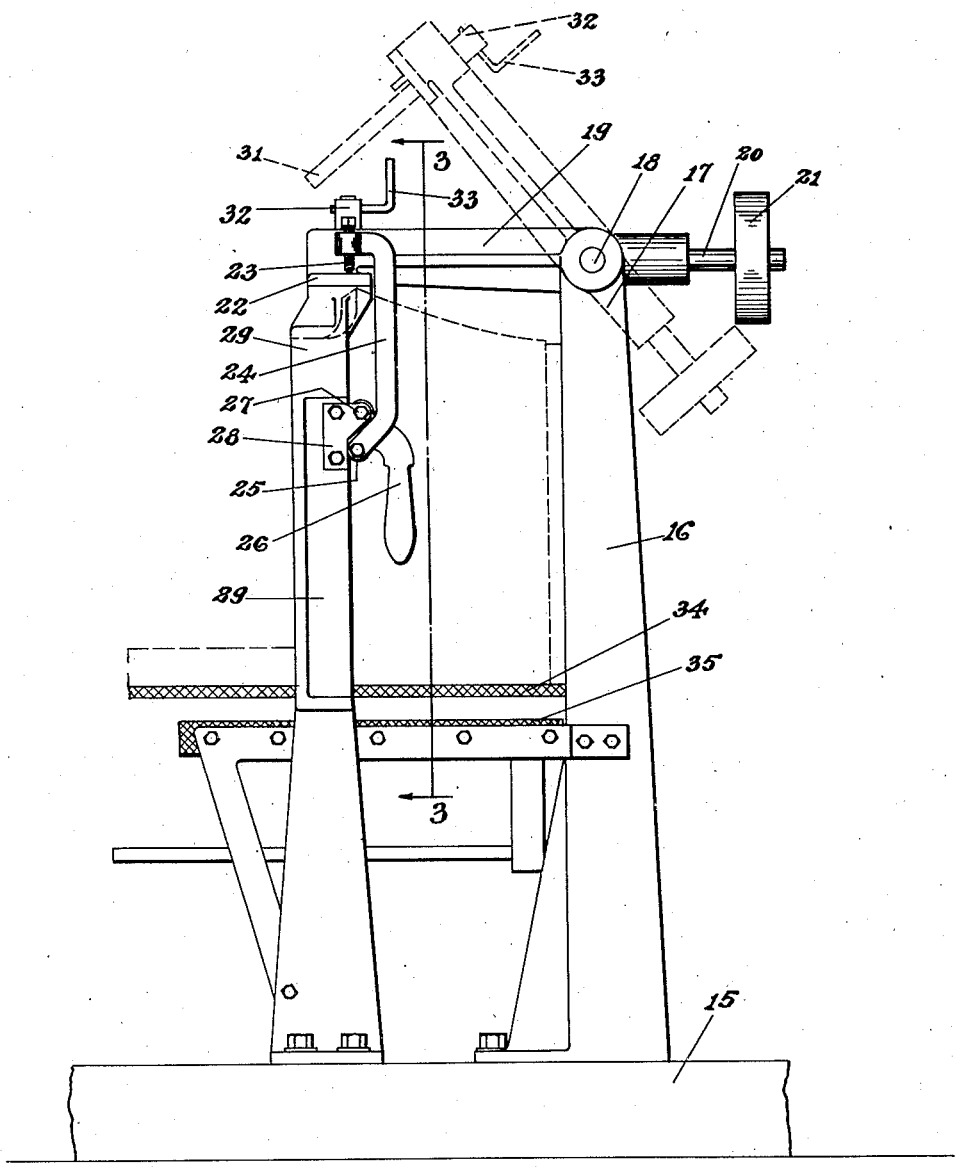
Figure 1 is a view in side elevation of the jig structure embodying my invention, the cowl portion of the automobile body and the positioning mechanism therefor being shown in dotted lines, the latter being in raised position.

One feature of my invention consists in providing means for positioning the cowl panel in the jig, including a positioning member which may be swung into place to engage the panel and hold it correctly positioned with reference to the framework of the jig and body frame members to which it is to be welded, and which positioning member may be swung back to an inoperative position to permit the removal of the body frame and cowl from the welding jig and the insertion of a body frame and cowl panel to be connected together. In connection with the assembly of bodies, including cowl panels, particularly such panels which are provided with vertical holes or openings through which the windshield stanchions pass, I find it desirable to utilize said holes in properly positioning and holding the panel in place during the welding operation. For this purpose I provide means mounted on the frame of the jig so as to swing to a position to engage in said holes. Suitable means may be provided for retaining such positioning means in operative position during the welding operation, but which can be quickly, easily and readily released, when desired. The positioning means may be counter-weighted, if desired, so that comparatively small effort is required to move the same from the operative to the inoperative position.

Another feature of my invention consists in providing means for welding two metal members together, including an electrode carried by the jig frame and in position to contact with one of the members to be joined, when the parts are properly assembled and held in place, adjacent the joint to be formed, and a second electrode carried by the jig frame, but spaced from the members to be joined, the welding operation being performed by means of a movable conductor bar fulcrumed on the last-mentioned electrode and the free end of which is brought into engagement with the other of said members to be joined at a point adjacent the joint to be formed, but out of line with the first mentioned electrode. In accordance with this feature of my invention the point of contact of the end of the conductor bar 37 with one member to be welded, is not in juxtaposition with reference to the electrode 34, and the pressure exerted through the conductor bar is not transmitted through the joint to be formed to the electrode 34, as has been customary heretofore. The welding current passes through the one metal member 12 from the electrode 34 in contact therewith, thence through the joint to be formed and to the point at which the free end of the conductor bar engages the joint, and when pressure is applied, the electrode 34 being so disposed that it does not offer such pressure. This results in a greatly simplified structure and affords more space for the workmen inside of the body.

In the drawing I have shown a form of welding jig as one illustrative embodiment of my invention and which I believe at present to be preferred. This welding jig is designed to receive a cowl panel 10 which is shaped to the desired contour to form that portion of the body in front of the front doors. The lower side edges of the cowl panel 10 have the inturned flanges 11 which are to be welded to the forward ends of the longitudinally extending body frame side sills 12. The form of cowl shown is equipped with suitable supports 13, having vertical passages 14 which are adapted to receive the windshield stanchions. The jig is provided with a base 15 and an end frame 16 against which the forward end of the cowl panel abuts. The end frame 16 has portions 17 which extend upwardly above the cowl panel when the latter is positioned in the jig. A rock-shaft 18 is journaled in these extensions. One or more positioning arms 19 are fixed on this rock-shaft 18, and when in operative position, extend rearwardly over the cowl, as shown in Fig. 1. Said arms 19 also have the forwardly projecting shanks 20 on each of which a counterweight 21 is mounted. The jig also includes the vertically-extending side members 29, mounted on the base 15 and provided with the gauge-stops 30 which engage the cowl panel at its rear vertical edges. Each arm 19 has a laterally-projecting portion 22 which, when the positioning arm is in operative position, engages the upper end of the corresponding side-member 29. Any suitable means may be provided for clamping the arms 19 in this operative position, but it is desirable that such clamping means be so constructed that they may be easily, readily and quickly released and applied. In the drawings, I have shown such a clamping arrangement, including a link 24, which carries at its upper end an adjustable pin 23 arranged to impinge upon the portion 22 of the arm 19. The lower end of the link 24 is pivoted to a lever 26 at the point 25, said lever being pivoted at 27 to a bracket 28 secured to a side member 29. The pivots 25 and 27 are substantially in vertical alignment with each other, when the parts are in clamping position, so that the movement of the lever 26, when it is moved to clamping position, acts on link 24 with a toggle action. A pin 31 is slidably mounted in the rear end of each arm 19, and when the arms are in operative position, and the cowl is correctly positioned, the pins 31 are received in the vertical passages 14 of the cowl, which are to receive the windshield stanchions. The heads 32 at the upper ends of the pins 31, are provided with the handles 33 by which the pins may be withdrawn from and inserted in the passages 14.

Longitudinally-extending electrodes 34 are supported by the frame members of the jig, one at each side of the jig, so that the forward portions of the body frame sills 12, will contact therewith. In the arrangement shown, to which, however, my invention is not to be limited, the body frame sills rest on these electrodes. If desired, suitable means (not shown) may be provided for clamping these sills in position on the electrodes 34. Another pair of electrodes 35 are also supported by the framework of the jig and extend parallel to, but are spaced apart from the electrodes 34. In the arrangement shown, to which, however, the invention is not to be limited, the electrodes 35 are on the outside of the jig frame and spaced from the parts which are to be welded together. The electrodes 35 are connected to one side of the secondary of the transformer 36, while the electrodes 34 are connected to the opposite side of said secondary. In order to complete the welding circuit and make the weld, I provide a conductor bar 37 preferably of copper or some other metal of high conductivity, which bar has a point 38 at one end. In use this conductor bar is operated like a lever, the electrode 35 forming its fulcrum, and pressure being applied through said lever at the spot where the point 38 at the end thereof engages one of the members to be welded together. It will be observed that by means of this conductor bar, welds may be made at any point along the electrode 34, and the conductor bar, 37 may be removed when the welds have been completed. The flange 11 of the cowl panel, 10 does not extend to the electrode 34 and the path of the welding circuit is from the electrode 34, through a portion of the sill 12, then through the joint to be made to the end 38 of the conductor bar at the point where it engages the flange 11, thence through said bar to the electrode 35. Since pressure is applied at the spot where the point 38 engages the flange 11, the weld will be produced at that point.

In operation, in the illustrative form of jig shown, the sheet-metal members going to make up the body, and which are to be welded together, are placed in the jig with the sills 12 resting and, if desired, clamped on the electrodes 34 and the flanges 11 of the cowl panel 10 extending beneath and in contact with said sills. After the sills and the cowl panel have been placed in the jig, the arms 19 are swung down until they engage the upper ends of the side members 29 of the jig frame and are clamped in that position by the toggle clamping mechanism including links 24 and levers 26. The pins 31 are then inserted in the passages 14 of the cowl, and thus the cowl is maintained correctly positioned in the welding jig. While the parts are thus held, welds are made at all points which it is desired to connect by welding, including a series of welds between the flanges 11 and the sills 12. These welds are made in the manner I have indicated by means of the movable conductor bars or levers 37. It will be noticed that this construction gives a great deal more space for workmen in the interior of the body as it is not necessary to clamp upon the upper surfaces of the sills 12 as in the construction shown in my pending application, above referred to.

I am aware that the embodiment of my invention illustrated in these drawings may be varied considerably without departing from the spirit thereof and, therefore, I desire to claim my invention broadly, as well as specifically, as indicated by the appended claims.

Having thus described my invention, what I claim as new and desire to secure by Letters Patent is:

1. In a machine for welding together sheet metal members to form an automobile body, a framework to receive in assembled relation a cowl panel and the members to which it is to be welded, a movable positioning member carried by said framework and having means to engage said cowl panel and hold the same in assembled position, and means for electrically welding said cowl panel and members together.

2. In a machine for welding together sheet metal members to form an automobile body, a framework to receive in assembled relation a cowl panel and the members to which it is to be welded, a movable positioning member carried by said framework and having means to engage said cowl panel and hold the same in assembled position, means for clamping said positioning member in predetermined position, and means for electrically welding said cowl panel and members together.

3. In a machine for welding together sheet metal members to form an automobile body, a framework to receive in assembled relation a cowl panel and members to which it is to be welded, a movable positioning member carried by said framework and carrying a pin arranged to engage in an opening in the cowl panel, and means for electrically welding said cowl panel and members together.

4. In a machine for welding together sheet metal members to form an automobile body, a framework to receive in assembled relation a cowl panel and the members to which it is to be welded, a movable positioning member carried by said framework and carrying a pin adapted to be inserted in an opening provided in the cowl panel, means for clamping said positioning member in operative position with said pin in said opening, and means for electrically welding said cowl panel and members together.

5. In a machine for welding together sheet metal members to form an automobile body, a framework to receive in assembled relation a cowl panel and the members to which it is to be welded, a positioning member mounted on said framework to swing with reference to said cowl panel, and having a part adapted to enter the windshield stanchion opening provided in the cowl panel, and means for electrically welding said cowl panel and members together.

6. In a machine for welding together sheet metal members to form an automobile body, a framework to receive in assembled relation a cowl panel and the members to which it is to be welded, a positioning member mounted on said framework to swing with reference to said cowl panel, a pin slidably mounted in said positioning member and adapted to enter the windshield stanchion opening provided in the cowl panel, and means for electrically welding said cowl panel together.

7. In a machine for welding together sheet metal members to form an automobile body, a framework to receive in assembled relation a cowl panel and the members to which it is to be welded, said framework including an end-frame, positioning members mounted on said end-frame to swing with reference to said cowl panel, and each having means to enter a windshield stanchion opening provided in the cowl panel, and means for electrically welding said cowl panel and members together.

8. In a machine for welding together sheet metal members to form an automobile body, a framework to receive in assembled relation a cowl panel and the members to which it is to be welded, said framework including an end frame against which the forward end of said cowl panel abuts, and side members engaging the rear side portions of said panel, positioning members movably mounted on said end frame and adapted to engage the upper ends of said side members, each of said positioning members having means to enter a windshield stanchion provided in the cowl panel, and means for electrically welding said cowl panel and members together.

9. In a machine for welding together sheet metal members to form an automobile body, a framework to receive in assembled relation a cowl panel and the members to which it is to be welded, said framework including an end frame against which the forward end of said cowl panel abuts, and side members engaging the rear side portions of said panel positioning members movably mounted on said end frame and adapted to engage the upper ends of said side members, each of said positioning members having means to enter a windshield stanchion opening provided in the cowl panel, means for clamping said positioning members in engagament with the upper ends of said side members, and means for electrically welding said cowl panel and members together.

10. In a machine for welding together sheet metal members to form an automobile body, a framework to receive in assembled relation a cowl panel and the members to which it is to be welded, said framework including an end frame against which the forward end of said cowl panel abuts, and side members engaging the rear side portions of said panel, positioning arms movably mounted on said end frame and adapted to engage the upper ends of said side members, each of said arms carrying a pin arranged to enter a windshield stanchion opening provided in the cowl panel, means for clamping said arms in engagement with the upper ends of said side members, and means for electrically welding said cowl panel and members together.

11. In a machine for welding together sheet metal members to form an automobile body. a framework to receive in assembled relation a cowl panel and the members to which it is to be welded, said framework including an end frame against which the forward end of said cowl panel abuts, and side members engaging the rear side portions of said panel, positioning arms movably mounted on said end frame and adapted to engage the upper ends of said side members, a pin slidably carried in each positioning arm and adapted to enter a windshield stanchion opening provided in the cowl panel, means for clamping said arms in engagement with the upper ends of said side members, and means for electrically welding said cowl panel and members together.

12. In a machine for welding together sheet metal members to form an automobile body, a framework to receive in assembled relation a cowl panel and the members to which it is to be welded, said framework including an end frame against which the forward end of said cowl panel abuts, and side members engaging the rear side portions of said panel, a rock-shaft journaled in said end frame, positioning arms carried by said rock-shaft and each provided with means at its rear end to enter a windshield stanchion opening provided in the cowl panel, and means for electrically welding said cowl panel and members together.

13. In a machine for welding together sheet metal members to form an automobile body, a framework to receive in assembled relation a cowl panel and the members to which it is to be connected, said framework including an end frame against which the forward end of said cowl panel abuts, and side members engaging the rear side portions of said panel, a rock-shaft journaled in said end frame, positioning arms carried by said rock shaft and each having means at its rear end adapted to enter a windshield stanchion opening provided in the cowl panel, a counter-weight carried by each of said arms, means for clamping said arms in engagement with the upper ends of said side members, and means for electrically welding said cowl panel and members together.

14. In a machine for welding together sheet metal members to form an automobile body, a framework to receive in assembled relation a cowl panel and the members to which it is to be welded, said framework including an end frame against which the forward end of said cowl panel abuts, and side members engaging the rear side portions of said panel, a rock-shaft journaled in said end frame, positioning arms carried by said rock-shaft and each having a laterally-extending ear at its rear end arranged to engage the upper end of the adjacent side member, a pin carried by each positioning arm and adapted to enter a windshield stanchion opening provided in the cowl panel when said ear is in engagement with the upper end of the side member, and means for electrically welding said cowl panel and members together.

15. In a machine for welding together sheet metal members to form an automobile body, a framework to receive in assembled relation a cowl panel and the members to which it is to be welded, said framework including an end-frame against which the forward end of said cowl panel abuts, and side members engaging the rear side portions of said panel, a rock-shaft journaled in said end frame, positioning arms carried by said rock-shaft and each having a laterally-extending ear at its rear end arranged to engge the upper end of the adjacent side member, a pin carried by each positioning arm and adapted to enter a windshield stanchion opening provided in the cowl panel, when said ear is in engagement with the upper end of the side member, clamping mechanism carried by said side members and engaging said ears to retain the positioning arms in engagement with the upper ends of said side members, and means for electrically welding said cowl panel and members together.

16. In an apparatus of the class described, the combination of a framework to receive and support the members to be welded together, a fulcrum electrode adjacent the joint between said members but out of contact therewith, a second electrode disposed in contact with one of said members adjacent said joint, and a connector lever adapted to fulcrum on said fulcrum electrode and to exert a pressure upon said members at a point out of line with said second electrode to complete a circuit between said electrodes through said members at the point where a weld is to be formed.

17. In an apparatus of the class described, the combination of a framework to receive and retain members to be welded together, an electrode adjacent the joint between said members but out of contact therewith, a second electrode disposed in contact with one of said members adjacent said joint, and a connector adapted to complete a circuit from one electrode to the other, at the points where a weld is to be formed, at any point along said joint to thereby weld the members together, the contacting point of said connector being disposed out of juxtaposition with reference to said second electrode.

18. In an apparatus of the class described, the combination of a framework to receive and retain members to be welded together, a fulcrum electrode disposed out of contact with said members, a stationary electrode positioned in contact with one of said members adjacent the joint, and a connector lever adapted to fulcrum on said fulcrum electrode and to exert an upward pressure on said members at the joint at a point out of line with said stationary electrode to complete an electric circuit between said electrodes through said members to weld the same together.

19. In an apparatus of the class described, the combination of a framework to receive and retain members to be welded together, a fulcrum electrode disposed out of contact with said members, a stationary electrode disposed in contact with one of said members adjacent the joint, and a connector lever adapted to fulcrum on said fulcrum electrode and to contact with and exert pressure on the other of said members at the joint at a point out of juxtaposition with said stationary electrode to complete an electric circuit between said electrodes through said members to weld the same together.

20. In an electric welding jig for sheet metal automobile bodies, a framework to receive in assembled relation a cowl panel and body frame sills to be welded together, said framework including vertical standards at its forward end, said standards having portions extending above the cowl panel when in assembled position, a positioning member pivotally mounted on said extending portions and extending rearwardly over the cowl panel, said positioning members having means to engage the cowl panel and hold the same in assembled position, and means to weld said cowl panel and sills together.

21. In an apparatus of the class described, the combination with a framework to receive and retain parts to be welded together, of a fulcrum electrode disposed out of contact with said members, a stationary electrode disposed in contact with one of said members, a conductor lever adapted to fulcrum on said fulcrum electrode and to contact with and exert pressure on the other of said members at the joint at a point where said members are to be welded together to complete an electric circuit between said electrodes through said members, said electrodes and conductor lever all being disposed on the same side of the joint where the weld is to be formed.

In testimony whereof, I affix my signature.

JOSEPH LEDWINKA.